US009146555B2

(12) United States Patent
Kashyap et al.

(10) Patent No.: US 9,146,555 B2
(45) Date of Patent: Sep. 29, 2015

(54) SYSTEM AND METHOD FOR MANAGING LIFE-CYCLE OF BATCH IN PRODUCTION CONTROL SYSTEM IN REAL TIME

(71) Applicant: YOKOGAWA ELECTRIC CORPORATION, Musashino, Tokyo (JP)

(72) Inventors: Naveen Kashyap, Bangalore (IN); Jagadeesh Narayanarao, Bangalore (IN); Sastry Garimella, Bangalore (IN)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 385 days.

(21) Appl. No.: 13/628,275

(22) Filed: Sep. 27, 2012

(65) Prior Publication Data

US 2013/0173038 A1     Jul. 4, 2013

(30) Foreign Application Priority Data

Dec. 28, 2011   (IN) .......................... 4630/CHE/2011

(51) Int. Cl.
  *G05B 23/02*   (2006.01)
(52) U.S. Cl.
  CPC .................................. *G05B 23/0213* (2013.01)
(58) Field of Classification Search
  USPC ..................................................... 700/9, 95
  See application file for complete search history.

(56) References Cited

U.S. PATENT DOCUMENTS

| 6,522,939 B1 | 2/2003 | Strauch et al. |
| 2002/0156548 A1 | 10/2002 | Arackaparambil et al. |
| 2003/0235211 A1 | 12/2003 | Thiru et al. |

FOREIGN PATENT DOCUMENTS

| JP | 2009-237645 A | 10/2009 |
| JP | 2011-198169 A | 10/2011 |

OTHER PUBLICATIONS

Japanese Office Action dated Dec. 3, 2013, issued in corresponding Japanese Patent Application No. 2012-279344 with English translation(4 pages).
Singapore Written Opinion dated Jan. 22, 2014, issued in corresponding Singapore Patent Application No. 201207068-6 (17 pages).

*Primary Examiner* — Carlos Ortiz Rodriguez
(74) *Attorney, Agent, or Firm* — Westerman, Hattori, Daniels & Adrian, LLP

(57) ABSTRACT

A system and method for managing life cycle of a batch in a production control system in real time. The system comprises of an enterprise management system, manufacturing execution system (MES), task execution assistance (TEA) system and a production control system. The TEA system is interfaced between the MES and the production control system for executing the production request. The batch production request generated by the enterprise management system is received by the MES wherein the MES forwards the batch production request to the TEA system. The TEA system obtains information required to execute the batch production request from the production control system. Upon obtaining the information the TEA system instructs an operator to create the batch in the production control system. The production control system confirms the creation of the batch and updates real time status of the batch to the TEA system.

13 Claims, 3 Drawing Sheets

SYSTEM AND METHOD FOR MANAGING LIFE-CYCLE OF BATCH IN PRODUCTION CONTROL SYSTEM IN REAL TIME

TECHNICAL FIELD

The present disclosure relates to the field of batch production process in an automated industry. More particularly, embodiments of the disclosure relate to a system and method for managing life cycle of a batch in a production control system in real time.

BACKGROUND

Batch production is a technique used in manufacturing industries, in which the object is created stage by stage over a series of workstations in a production control system. An enterprise application used in a manufacturing organization generates a production request for each of the object to be created. The manufacturing execution system (MES) manages execution of each of the production request by coordinating with the production control system.

At present lot of initiatives is happening towards integrating all the applications from enterprise applications to MES and from MES to the production control system. However, in the batch production scenario, though ERP-MES integration is realized, MES to real-time batch production control system is a challenge. So far efforts are made to integrate the real-time production control system through Object Linking and Embedding for Process Control (OPC) interface. Still integrating the batch production control system to manage overall life cycle of the batch is not achieved.

Hence, there exists a need for bridging the gap between the MES layer and the batch production control system layer to manage overall life cycle of the batch in the production control system in real time and to increase the flexibility, efficiency and transparency of the industrial production.

SUMMARY OF THE DISCLOSURE

The shortcomings of the prior art are overcome and additional advantages are provided through the provision of method and system of the present disclosure.

The present disclosure solves limitations of existing techniques by bridging the gap between the MES layer and the batch production control system layer to manage overall life cycle of the batch in the production control system in real time.

In one embodiment, the present disclosure enables effective monitoring and control of production process of a batch.

In one embodiment, the present disclosure provides improved productivity by providing improved coordination between the distributed control system (DCS) operations and the other plant operations.

In one embodiment, the present disclosure integrates manufacturing execution system (MES) and production control system to reduce turnaround time and improved coordination.

Additional features and advantages are realized through the techniques of the present disclosure. Other embodiments and aspects of the disclosure are described in detail herein and are considered a part of the claimed disclosure.

In one embodiment, the present disclosure provides a system for managing life cycle of a batch in a production control system in real time. The system comprises of an enterprise management system, manufacturing execution system (MES), task execution assistance (TEA) system and a production control system. The TEA system is interfaced between the MES system and the production control system. The enterprise management system generates a batch production request. The MES receives the generated batch production request and generates one or more batch commands for the corresponding batch production request.

In one embodiment, the TEA system is configured into plurality of interfaces comprising a command receiving interface, a command execution engine (CEE), and one or more adapter interface for executing the batch production request.

In one embodiment, the command receiving interface of the TEA receives the generated one or more batch commands from the MES. The command execution engine (CEE) is configured to list, execute and monitor one or more actions to be performed in a sequence for the received one or more batch commands. The one or more adapter receive one of the listed one or more actions to be performed from the CEE and routes it to corresponding interface provided on the production control system. The production control system provides required information for one or more actions to be performed to the CEE through the corresponding interface for completing the one or more actions. After providing the required information to the CEE, the CEE instructs an operator to execute one or more batch commands in the production control system. The production control system executes the batch commands and updates status of the batch to the command receiving interface through the corresponding adapter interface.

In one embodiment, the present disclosure provides a method for managing life cycle of a batch in a production control system in real time. The method comprising acts of generating a batch production request by an enterprise system. The generated batch production request is received by a manufacturing execution system (MES) wherein the MES generates one or more batch commands for the received batch production request. The generated one or more batch commands are received by a command receiving interface of a task execution assistance (TEA) system.

In one embodiment, the command execution engine (CEE) of the TEA system lists one or more actions to be performed in a sequence for the one or more batch commands. The listed one or more actions is received by corresponding adapter interface of the TEA system. The corresponding adapter interface then routes the received one or more actions to corresponding interface provided on the production control system. Upon receiving the one or more action by the corresponding interface the production control system provides required information for the one or more actions to be performed to the CEE through the corresponding interface for completing the one or more actions. After completing the one or more actions, the CEE instructs an operator to execute the batch commands in the productions control system. The production control system executes the batch commands upon receiving the instruction from the operator and updates status of the batch to the command receiving interface through OPC AE adapter interface.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

An embodiment of the present disclosure provides a system and method for managing life cycle of a batch in a production control system in real time.

Figure 1:
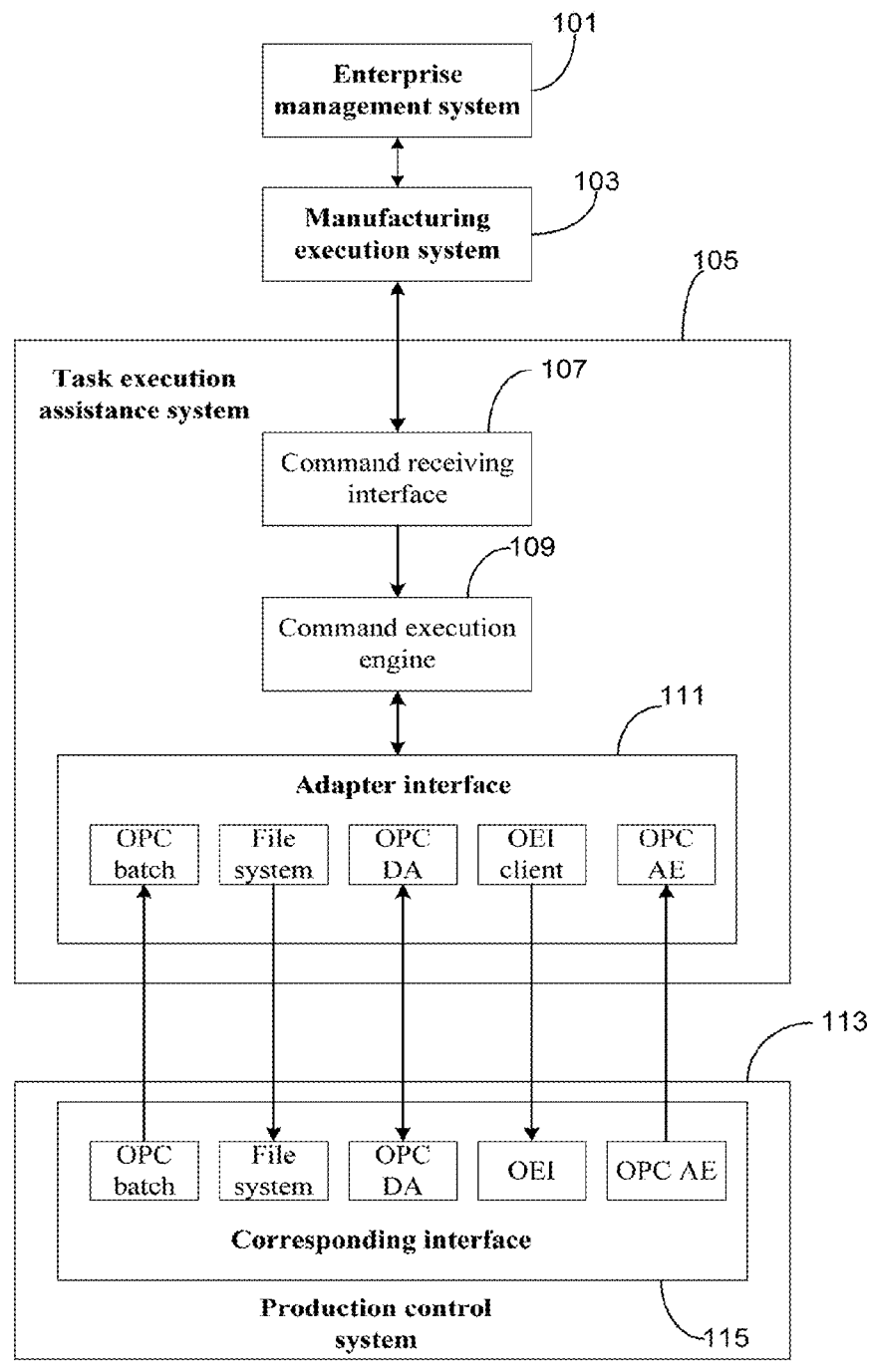
FIG. 1 is an exemplary block diagram which illustrates system architecture for managing life cycle of a batch in a production control system.

FIG. 1 is an exemplary block diagram which illustrates system architecture for managing life cycle of a batch in a production control system.

The system comprises of an enterprise management system 101, manufacturing execution system (MES) 103, task execution assistance (TEA) system 105 and a production control system 113. The TEA system 105 is interfaced between the MES 103 and the production control system 113. The TEA system 105 is configured into plurality of interfaces comprising command receiving interface 107, command execution engine 109 and one or more adapter interface 111. The one or more adapter interface 111 are Object Linking and Embedding for Process Control (OPC) batch, OPC data access (DA), operation efficiency improvement (OEI) client, OPC alarms and events (AE) and file system. The production control system 113 is provided with plurality of corresponding interfaces 115 to communicate with the adapter interface 111. The corresponding interfaces 113 are OPC batch, OPC DA, OEI, and OPC AE and file system.

OPC is all about open productivity and connectivity in industrial automation and the enterprise management systems that support industry. The OPC batch carries information required for creating the batch to the specialized needs of the batch processes. It provides interfaces for the exchange of equipment and current operating conditions. The OPC DA is used to move real-time data from the production control system 113 to Human Machine Interface (HMIs) and other display clients. The OPC AE provides alarm and event notifications on demand. These include process alarms, operator actions, informational messages, and tracking/auditing messages.

The enterprise management system 101 are large-scale, integrated application-software packages that use the computational, data storage, and data transmission power of modern information technology to support business processes, information flows, reporting, and data analytics within and between the automated industries. The enterprise management system 101 is configured in the automated industry to receive any purchase order from a customer for one or more products. The enterprise management system 101 is also used to deliver the one or more products to the customer and send invoice for the products delivered to the customer.

The enterprise management system 101 operates as a source of production request for a production facility. The enterprise management system 101 generates a batch production request for each of the customer order. The MES 103 receives the generated batch production request from the enterprise management system 101. The MES 103 operates as an integration layer between the enterprise management system 101 and the production control system 113 to coordinate and manage execution of the production requests. The MES 103 bridges the gap between the enterprise management system 101 and the production control system 113 using on-line information to manage the current application of manufacturing resources like people, equipment and inventory. The workflow engine configured in the MES 103 generates one or more batch commands for the received batch production request. The one or more batch commands are create batch, start batch, suspend batch and complete batch. The command receiving interface 107 receives one or more batch commands generated by the workflow engine and send the one or more batch commands to the command execution engine 109 for execution. The command execution engine 109 lists one or more actions to be performed to execute the one or more batch commands.

In one embodiment, for executing the create batch command, the command execution engine 109 lists one or more actions such as collecting formula data, collecting applicable equipment data and creating a scheduler file. The command execution engine 109 communicates with the OPC batch interface provided on the production control system 113 through the OPC batch adapter interface configured in the command execution engine 109 to collect the formula data which is required to create the batch. Also, the command execution engine 109 communicates with the OPC DA interface provided on the production control system 113 through the OPC DA adapter interface to collect the equipment data which is required to create the batch. After obtaining the required information from the production control system 113 the command execution engine 109 creates a scheduler file and stores the scheduler file on the production control system 113. The production system 113 executes the scheduler file for creating the batch. After execution of the scheduler file, the command execution engine 109 instructs an operator through the OEI client adapter interface to manually create the batch in the production control system 113. The production control system 113 upon receipt of instruction from the operator creates the batch and confirms the creation of the batch through the OPC AE adapter interface.

In one embodiment, the command execution engine 109 informs the operator to start the batch through the OEI adapter interface once the batch is created. After the batch has been started, the production control system 113 updates real time status of the batch to the command execution engine 109 through the OPC AE adapter interface. In an alternative embodiment, the operator can query the production control system to get the current status of the batch. In one embodiment, the command execution engine 109 informs the operator as and when requirement arises for completing the batch or suspending the batch through the OEI adapter interface.

Figure 2A:
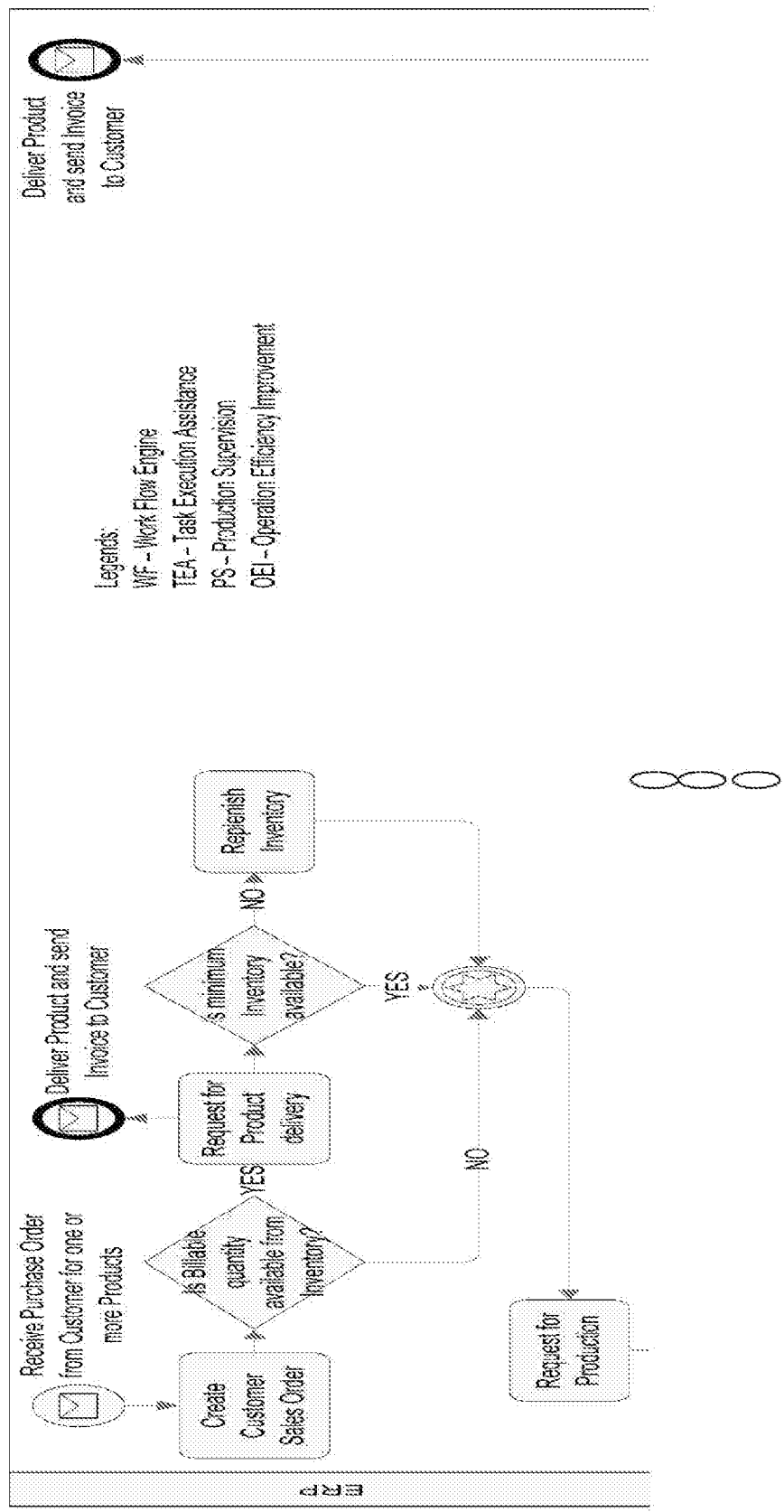
FIGS. 2A and 2B show overall batch production process in accordance with an embodiment of the present disclosure.
Figure 2B:
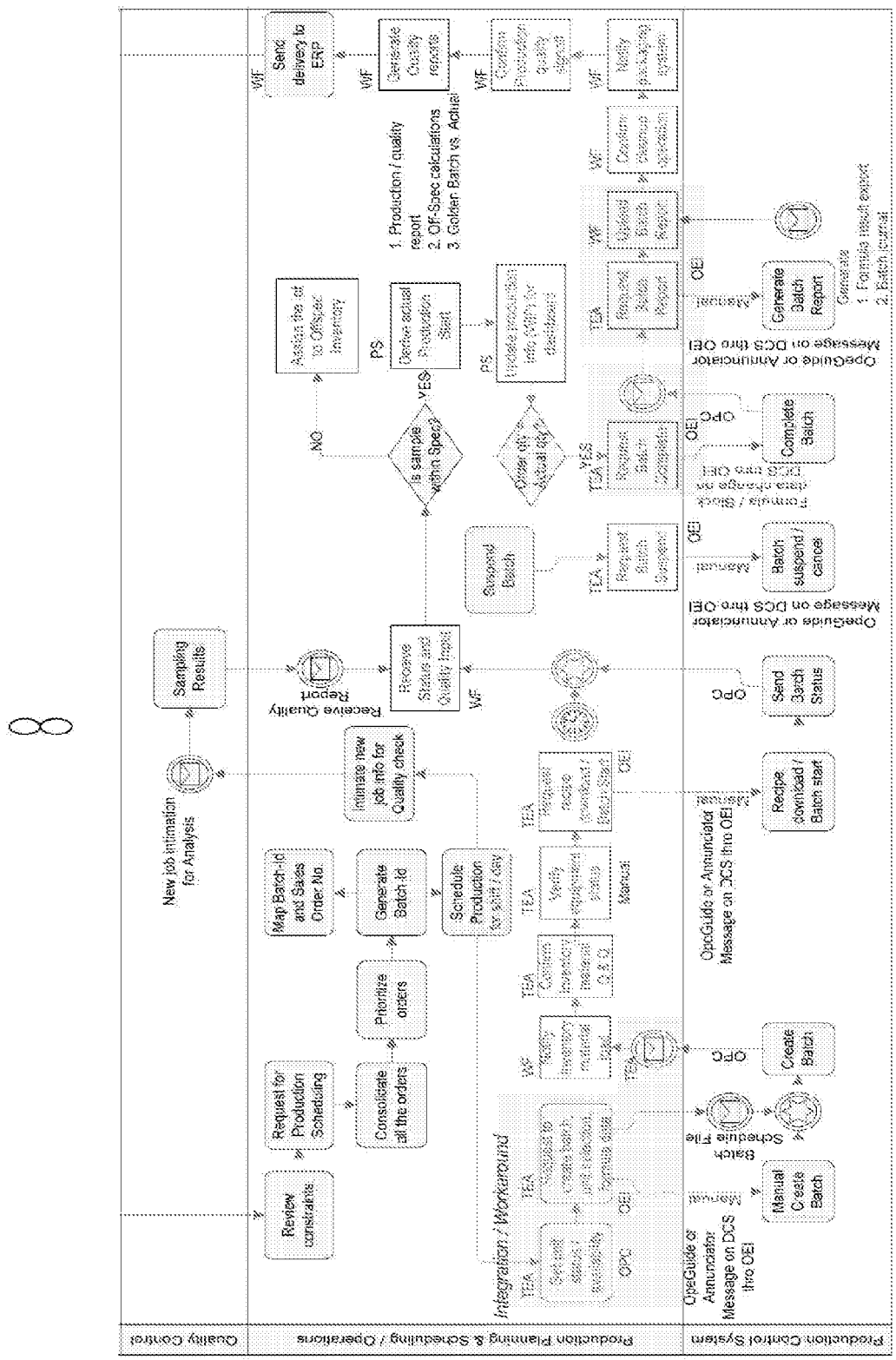

FIGS. 2A and 2B show overall batch production process in accordance with an embodiment of the present disclosure.

The enterprise management system 101 receives purchase order from one or more customer for one or more products. For each of the received order the enterprise management system 101 creates a customer sales order and checks if the billable quantity is available from the inventory for the orders. If the billable quantity is available the enterprise management system 101 delivers the product to the customer and sends an invoice to the customer. If the billable quantity is not available from the inventory the enterprise management system 101 requests manufacturing execution system (MES) 103, which is interfaced between the enterprise management system 101 and a production control system 113, for execution of the orders.

The MES 103 analyzes constraints involved in the production of the one or products and then schedules the production request. The MES 103 consolidates all the orders, prioritizes the orders and generates batch id for production of each of the product. In one embodiment, one or more batches are used for production of a particular product. The MES 103 maps batch id and sales order number and schedules the production either shift wise or day wise. Upon scheduling the production, the MES 103 requests quality control unit for checking the quality of the materials used for the production. The MES 103 receives the results of the quality check from the quality control unit and requests task execution assistance system (TEA) 105 for executing the production request. The TEA system 105 is an integration layer interfaced between the MES 103 and the production control system 113.

The TEA system 105 performs one or more actions for executing the production request. The one or more actions are collecting formula data and applicable equipment unit's data from the production the control system 113 and creating scheduler file. The TEA system 105 requests the production control system 113 for providing the formula data and applicable equipment unit's data required for creating a batch in the production control system 113 through Object Linking and Embedding for Process Control (OPC) interface. After obtaining the required data from the production control system 113, the TEA system 105 creates a scheduler file and stores the scheduler file on the production control system 113. The production control system 113 creates the batch and notifies the creation of the batch to the TEA system 105 through the OPC interface. The TEA system 105 in turn notifies the creation of the batch to the workflow engine of the MES 103.

The TEA system 105, upon creation of the batch, requests the production control system 113 to start the batch through the operation efficiency improvement (OD) interface. Upon receiving the instructions, the production control system 113 starts the batch and sends status of the batch to the TEA system 105 through the OPC interface. The TEA system 105 in turn notifies the status of the batch to the workflow engine of the MES 103 The workflow engine checks whether the manufactured product in the batch is manufactured as per the scheduled specification or not. If the manufactured product is as per the scheduled specification the workflow engine starts the actual production, if not then the workflow engine assigns the offspec to the inventory. The workflow engine also checks if the quantity ordered by the customer meets the actual quantity produced in the batch. If the quantity ordered by the customer is same as the actual quantity produced in the batch the TEA system 105 requests the production control system 113 for completing the batch through the OEI interface.

The production control system 113 completes the batch and updates the batch completion status to the TEA system 105 through the OPC interface. In one embodiment, the TEA system 105 requests the production control system 113 for providing the batch report through the OEI interface. The production control system 113 generates the batch report and uploads the batch report to the workflow engine. Upon receiving the batch report, the workflow engine cleans up the operation of the batch production process, generates quality reports and delivers the product to the customer through the enterprise management system 101.

In one embodiment, the TEA system 105 requests the production control system 113 for suspending the batch through the OEI interface. After suspending the batch the production control system confirms the suspension of the batch to the TEA system 105 through the OPC interface.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system for managing life cycle of a batch in a production control system in real time comprising:
   an enterprise management system configured to generate a batch production request;
   a manufacturing execution system (MES) configured to receive the generated batch production request and to generate one or more batch commands corresponding to the batch production request; and
   a task execution assistance (TEA) system interfaced between the MES and the production control system is configured into plurality of interfaces comprising:
   a command receiving interface configured to receive the generated one or more batch commands from the MES and to update status to the MES,
   a command execution engine (CEE) configured to list, execute and monitor one or more actions to be performed in a sequence for the received one or more batch commands;

one or more adapter interface for receiving one of the listed one or more actions to be performed from the CEE and routes it to corresponding interface provided on the production control system;

the production control system configured to supply required information for one or more actions to be performed to the CEE through the corresponding interface for completing the one or more actions.

2. The system as claimed in claim 1, wherein the batch commands are selected from a group comprising create batch, start batch, suspend batch, and complete batch.

3. The system as claimed in claim 1, wherein the one or more adapter interface in the TEA and the corresponding interfaces in the production control system are selected from a group comprising Object Linking and Embedding for Process Control (OPC) batch, OPC data access (DA), operation efficiency improvement (OEI), OPC alarms and events (AE) and file system.

4. The system as claimed in claim 1, wherein the one or more actions are collecting formula data, collecting applicable equipment units data, creating a scheduler file, informing an operator for executing the batch commands and tracking the batch.

5. The system as claimed in claim 1, wherein the CEE creates a scheduler file and stores the created scheduler file on the production control system through a file system adapter interface.

6. The system as claimed in claim 5, wherein the production control system executes the stored scheduler file for creating the batch.

7. The system as claimed in claim 1, wherein the production control system executes the one or more batch commands on receiving an instruction from an operator through an operation efficiency improvement (OEI) adapter interface.

8. The system as claimed in claim 7, wherein the production control system confirms the execution of the one or more batch commands and updates status of the batch to a command receiving interface of a TEA through an Object Linking and Embedding for Process Control Alarms and Events (OPC AE) adapter interface.

9. A method for managing life cycle of batch in a production control system in real time comprising acts of:

generating a batch production request by an enterprise system;

receiving the generated batch production request by a manufacturing execution system (MES) and generating one or more batch commands for the received batch production request;

receiving the generated one or more batch commands by a command receiving interface of a task execution assistance (TEA) system;

listing one or more actions to be performed in a sequence for the one or more batch commands by a command execution engine (CEE) of the TEA system;

receiving the one or more actions by corresponding adapter interface of the TEA system and routing the received one or more actions to corresponding interface provided on the production control system;

providing required information for the one or more actions to be performed by the production control system to the CEE through the corresponding interface for completing the one or more actions;

providing instruction to an operator to execute one or more batch commands in the production control system by the CEE through operation efficiency improvement (OEI) adapter interface upon completion of the one or more actions; and executing the one or more batch commands and reporting status of the batch to the command receiving interface by the production control system for managing life cycle of the batch.

10. The method as claimed in claim 9, wherein the one or more batch commands are selected from a group comprising create batch, start batch, suspend batch, and complete batch.

11. The method as claimed in claim 9, wherein the one or more actions are collecting formula data, collecting applicable equipment units data, creating a scheduler file, informing an operator for executing the batch commands and tracking the batch.

12. The method as claimed in claim 9, wherein the one or more actions to be performed in a sequence for the one or more batch commands is executed by the CEE of the TEA system.

13. The method as claimed in claim 9, wherein status of the one or more actions performed for the one or more batch commands by the CEE of the TEA system is reported to the MES.

* * * * *